United States Patent

[11] 3,608,019

| [72] | Inventors | Wasuke Sato<br>Kawasaki;<br>Osamu Uemura, Yokohama; Akihiro<br>Hashimoto, Yokohama, all of Japan |
|---|---|---|
| [21] | Appl. No. | 17,156 |
| [22] | Filed | Mar. 6, 1970 |
| [45] | Patented | Sept. 21, 1971 |
| [73] | Assignee | Showa Denko K.K.<br>Tokyo, Japan |
| [32] | Priority | Mar. 8, 1969 |
| [33] | | Japan |
| [31] | | 44/17370 |

[54] METHOD AND APPARATUS FOR MANUFACTURING A BIAXIALLY ORIENTED CYLINDRICAL FILM BODY
4 Claims, 8 Drawing Figs.

[52] U.S. Cl. .................................................. 264/95,
18/1, 18/14, 264/209, 264/210
[51] Int. Cl. ......................................................... B29c 17/07,
B29c 23/00, B29d 23/04
[50] Field of Search .......................................... 264/95,
210, 209; 18/14 S, 1 FM, 1 FS

[56] References Cited
UNITED STATES PATENTS

| 2,961,930 | 11/1960 | Wamsley et al. ............. | 18/14 S |
| 3,231,651 | 1/1966 | Cheney ......................... | 264/95 |
| 3,317,951 | 5/1967 | Hureau ......................... | 18/14 S |

*Primary Examiner*—Robert F. White
*Assistant Examiner*—Jeffery R. Thurlow
*Attorney*—Kemon, Palmer & Estabrook

ABSTRACT: A method and apparatus for manufacturing a biaxially oriented cylindrical film body, which comprises providing a guide bar projecting above a mandrel to be inserted into a cylindrical film body, conducting said film body from the upper nip rollers positioned at the top of said guide bar down said guide bar to said mandrel and further to the lower nip rollers located below said mandrel with said guide bar and mandrel suspended by a plurality of pairs of rollers, whereby there is biaxially stretched said cylindrical film body by introducing compressed gas thereinto, while forming a thin layer of gas between the outer surface of said mandrel and the inner wall surface of said cylindrical film body.

INVENTOR.
Wasuke Sato
BY Osamu Uemura
Akihiro Hashimoto

Kenyon, Palmer & Estabrook

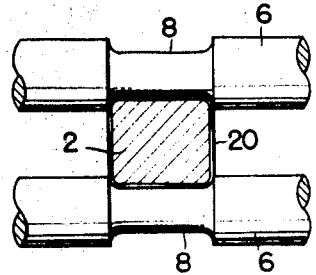
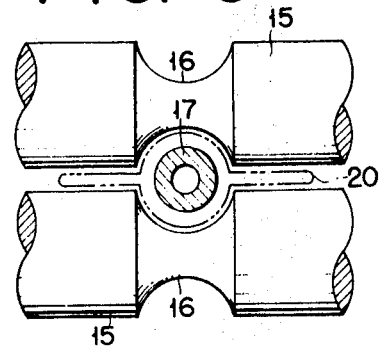
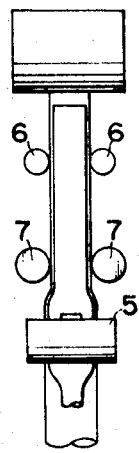
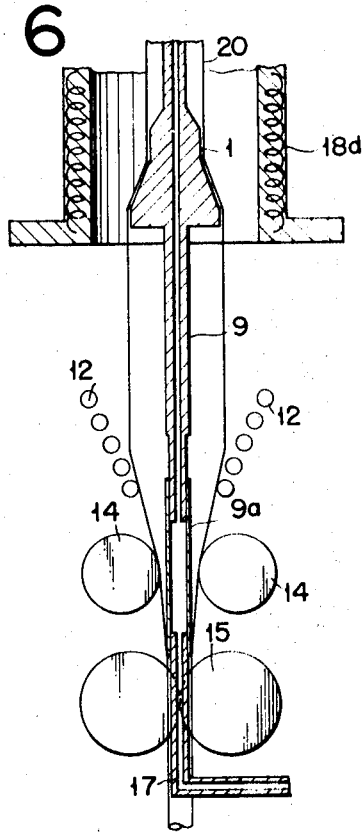

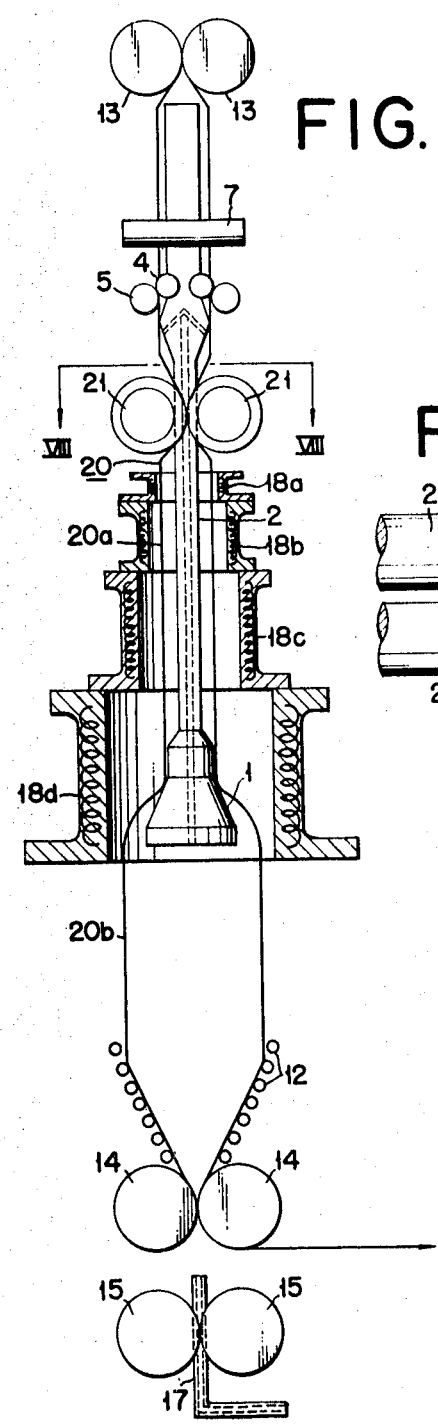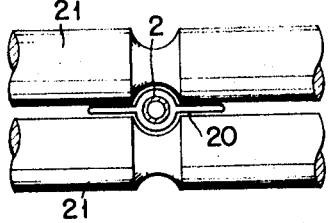

3,608,019

METHOD AND APPARATUS FOR MANUFACTURING A BIAXIALLY ORIENTED CYLINDRICAL FILM BODY

The present invention relates to a method and apparatus for manufacturing a biaxially oriented cylindrical film body by stretching an unprocessed film body made of thermoplastic resins, particularly those of polyolefin, vinylidene chloride and polyethylene terephthalate in two directions, i.e., radial and axial directions.

The known method for manufacturing a stretched cylindrical package film body involves a process of stretching a flat sheet of film to a thin layer and fusing both edges together or stretching a cylindrical film body as it is in its radial and axial directions to reduce its wall thickness. The greatest problem with the former process is that since the stretched flat sheet of film must have both edges fused together to be made into a cylindrical body, there is additionally required a sealing step. On the other hand, the latter process presents technical difficulties in stretching a cylindrical film body as it is, though it is free from the shortcomings encountered with the former. Accordingly, there has not yet been realized any satisfactory method for preparing such film body. For further illustration, there is known another process of stretching a cylindrical film body as it is by means of a mandrel. With this process, said cylindrical film body is unavoidably cut open in its lengthwise direction when it is brought down from the mandrel due to the particular construction of the apparatus involved. This is no resolution of the drawbacks associated with the former prior art process. There is proposed still another process of introducing compressed air into a heated cylindrical film body, followed by stretching. However, this latter method is also handicapped by the fact that unless the material of a film body to be stretched has considerably excellent properties, the stretch ratio can not be elevated. Past experiments show that even when the stretch ratio in both radial and axial directions were limited to below four times (2×2) the wall thickness of a cylindrical film body prominently segregated and stretching beyond the aforesaid ratio was impossible. Further it was extremely difficult to reduce the degree of said segregation of wall thickness to less than 5%. Even though this might be feasible, there would be required tremendous plant cost.

The present invention has been accomplished in view of the above-mentioned circumstances to provide a method and apparatus for manufacturing a biaxially oriented cylindrical film body which enables said film body to be stretched as it is without being unduly tensioned or slackened or deteriorated in quality. The present invention comprises conducting a cylindrical film body from upper nip rollers positioned at the top of the guide bar, down said guide bar, through the interstice between rotatably embedded rollers and support rollers, to a mandrel and further to lower nip rollers located below said mandrel by providing said guide bar projecting above said mandrel to be inserted into said cylindrical film body; rotatably pressing back preventing rollers to said guide bar so as to prevent the shaking of said mandrel; rotatably embedding a pair of rollers in the peripheral surface of said guide bar; disposing support rollers adjacent to said rotatably embedded rollers with said film body allowed to pass therebetween; with said guide bar and mandrel suspended by said support rollers, and biaxially stretching said cylindrical film body by introducing compressed gas thereinto, said stretching being conducted while forming a thin layer of gas between the outer surface of said mandrel and the inner wall surface of said cylindrical film body.

The present invention can be more fully understood from the following detailed description when taken in connection with reference to the accompanying drawings, in which:

FIG. 3 is a side view of the upper part of the apparatus of FIG. 1;

FIG. 4 is a cross-sectional view on line TV—IV of FIG. 1;

FIG. 5 is a cross-sectional view on line V—V of FIG. 1;

FIG. 6 is a cross-sectional view of the lower part of the apparatus showing the starting manner in which there is stretched a cylindrical film body;

FIG. 7 is an elevation, partly broken away, of an apparatus according to another embodiment of the invention; and FIG. 8 is a cross section on line VIII—VIII of FIG. 7.

Figure 1:
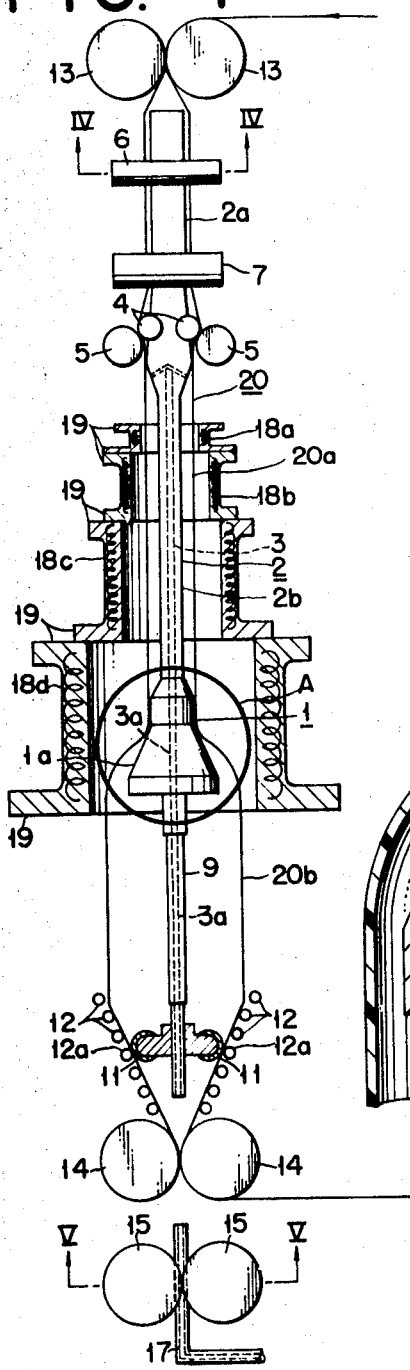
FIG. 1 is an elevation, partly broken away, of an apparatus according to an embodiment of the present invention.
Figure 2:
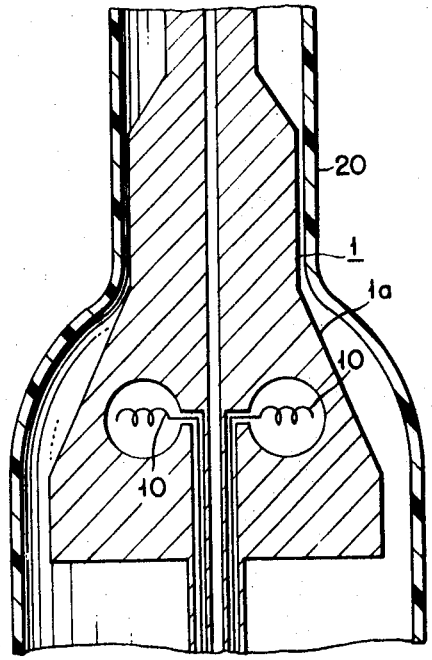
FIG. 2 is a cross-sectional view of part A of FIG. 1.

There will now be described by reference to the accompanying drawings the preferred embodiments of the method and apparatus of the present invention for manufacturing a biaxially oriented cylindrical film body. Referring to FIG. 1, numeral 1 represents a mandrel. It assumes a taper form at the top and center and a round columnar form at the other and contains electrical heaters 10 illustrated in FIG. 2. Vertically projecting above said mandrel 1 is a guide bar 2 whose upper part 2a assumes a thick annular columnar form and whose lower part 2b presents a round columnar form. At the lower part 2b of said guide bar 2 and through the axial center of said mandrel 1 are formed passages 3 and 3a respectively communicating with each other so as to introduce compressed gas, for example, compressed air. The upper end of said passage 3 is open to the periphery of the boundary between the upper and lower parts 2a and 2b of said guide bar 2. In said boundary are rotatably embedded a pair of rollers 4. And there are also provided a pair of support rollers 5 in a manner to face them. Said support rollers 5 are disposed adjacent to said rotatably embedded rollers 4 with said cylindrical film body allowed to pass therebetween, thereby suspending said mandrel 1 and guide bar 2. Said support rollers 5 are fixed to the support member (not shown) of the apparatus. Further at the upper part 2a of said guide bar 2 are provided two parallel arranged pairs of shock-preventing rollers 6 and 7 shown in FIGS. 1 and 3 for preventing the shaking of said mandrel 1 and guide bar 2. These shock-preventing rollers 6 and 7 have, as shown in FIG. 4, a shallow groove 8 formed around the central part of the peripheral surface in which said rollers 6 and 7 contact said guide bar 2. A slight engagement of said guide bar 2 with said depression 8 prevents said guide bar 2 and in consequence said mandrel 1 from being shaken lengthwise and crosswise. Further, said mandrel 1 has a pipe 9 vertically projecting downward from its bottom to allow compressed gas to be introduced therethrough. Throughout the axial center of said pipe 9 is bored a compressed gas passage 3a communicating with the aforementioned similar passage 3, and open at the bottom end. The lower portion of said pipe 9 has a slightly smaller diameter than the other portions. On both sides of said lower portion are projectingly provided inner guide rollers 11 for guiding the stretched film body to the later described lower nip rollers 14. On both sides of the assembly of said guide rollers 11 are arranged a large number of outer guide rollers 12 in such a manner that the interval between the rows of said rollers 12 is progressively reduced downward. A pair 12a involved in said outer guide rollers 12 contact said inner guide rollers 11 with the film body allowed to pass therebetween so as to prevent the shaking of said mandrel 1 in cooperation with the aforementioned shock-preventing rollers 6 and 7. Numerals 13 and 14 represent upper and lower nip rollers disposed adjacent to the top of said guide bar 2 and the bottom of said compressed gas pipe 9 respectively. The film body is stretched lengthwise due to the different peripheral speeds of said upper and lower nip rollers 13 and 14. Said nip rollers 14 are so arranged as to be freely set apart from each other. Below them are disposed nip rollers 15 bearing a groove 16 which is formed, as shown in FIG. 5, at a part of the peripheral surface of said nip rollers 15 so as to have a semicircular cross section. Through a passage with a round cross section defined by said two mutually facing semicircular grooves 16 is inserted an auxiliary pipe 17 for introduction of compressed gas. Said auxiliary compressed gas pipe 17 is bent sidewise at the lower part. The end of said bent portion is connected to a source of compressed gas (not shown). Numerals 18a to 18d denote cylindrical heaters fitted in a manner to surround the outer periphery of the lower part 2b of said guide bar 2 and mandrel 1. For mutual connection, said heaters have flanged portions 19 formed both at the top and bottom, the lower ones of said flanged portions 19 having a larger diameter and greater length in turn.

Said cylindrical film body is stretched in the following manner. Prior to operation, said mandrel 1 is heated to a prescribed temperature. Said nonstretched film body 20 is conducted from said upper nip rollers 13 down to said guide bar 2. Said film body 20 passes between said guide bar 2 and shock-preventing rollers 6 and 7, then between said rotatably embedded rollers 4 and support rollers 5, and further from the lower part 2b of said guide bar 2 to said mandrel 1. Stretching operation is started in the manner shown in FIG. 6. The lower ones 14 of said nip rollers 13 and 14 used in normal operation are left open. To the bottom end of said compressed gas pipe 9 is connected a pipe 9a made of rubber or plastics material, to which in turn is attached said auxiliary compressed gas pipe 17. The end of said cylindrical film body 20 is conducted from said auxiliary pipe 17 to said grooved nip rollers 15 used in starting the stretching operation. Further, said end portion is cut open, for example, by a cutter blade (not shown) to be drawn out downward.

Into said cylindrical film body is introduced compressed gas from said auxiliary pipe 17 through said passages 3a and 3 to maintain the interior atmosphere at a prescribed pressure. Said cylindrical film body 20 is heated on the inside by said mandrel 1 and on the outside by heaters 18a to 18d to a temperature adapted to be stretched. When said stretching is carried to a proper extent, said compressed gas pipe 9 is disconnected from said auxiliary pipe 17, and said nip rollers 14 which have been left open up to this point are closed and the stretched film body 20 is nipped off between said nip rollers 14 and grooved nip rollers 15. The end of the nipped portion of said stretched film body is conducted, as shown in FIG. 1, from said nip rollers 14 to a winding device (not shown). During operation, said upper nip rollers 13 and support rollers 5 are forcedly driven at the same peripheral speed, while said shock-preventing rollers 6 and 7 are allowed to rotate freely. Said nip rollers 14 and grooved nip rollers 15 are also forcedly driven at a peripheral speed determined in relation to that of said upper nip rollers 13 in accordance with the desired rate at which said cylindrical body 20 is stretched lengthwise.

Referring to transverse stretching, said cylindrical film body 20 is initially expanded along the lower conical part 1a of said mandrel 1, and the subsequent stretching is carried out by the pressure within said film body 20 which is in turn adjusted by the compressed air introduced. During normal operation, the ratio in which said film body is stretched crosswise is regulated by a ring (not shown) disposed adjacent to the bottom of said heater 18d to control the dimensions of the stretched film body 20. Needless to say, the ratio of said biaxial stretching is largely affected by the heating temperature and other factors.

As mentioned above, the method of the present invention stretches a cylindrical film body as it is in two axial directions with good yield. Further, where articles are to be packaged in said film body, it is only required to seal it at both ends, thus simplifying the sealing step. The groove formed in said shock-preventing rollers 6 and 7 is very shallow as illustrated in FIG. 4, and that part of said guide bar 2 which contacts said groove assumes an angular columnar form, and the diameter of said rollers 6 and 7 at various parts of said groove is fixed, so that the peripheral speed of that part of said rollers 6 and 7 contacting said film body does not prominently vary with respect to different parts of said groove as is the case with peripheral speed of said grooved rollers 15. Accordingly, the present invention does not cause said film body to be unduly tensioned or slackened, once normal operation is started. Further according to the present invention, the mandrel and guide bar are suspended at that part of the apparatus where said film body is not yet stretched, enabling it to display excellent properties after being stretched without any quality deterioration. With the apparatus of the present invention, said mandrel 1 is not intended during normal operation to limit the size of the stretched film body, but simply to guide it, so that it is allowed to have an extremely small diameter. If, therefore, the ratio of crosswise stretching is varied using a single mandrel, then there can be always obtained a stretched film body as a product with a varying collapsed width. While being stretched said film body is appreciably set apart from the mandrel, and consequently exhibits a good surface appearance free from any scars which might be caused by the otherwise required contactual sliding of said film body over the surface of the mandrel 1.

The present invention enables the suspended mandrel 1 to be fully prevented from being shaken simply be means of the shock-preventing rollers. After being stretched, the film body is still filled with compressed gas to maintain its inner pressure at an appreciably high level, so that there is only required a group 12 of said external guide rollers when said film body is to be properly collapsed by said nip rollers 14. Accordingly, the inner guide rollers 11 may be omitted as shown in FIG. 7, and in consequence when said film body begins to be stretched, it is possible to eliminate said compressed gas pipe 9 and connect said auxiliary pipe 17 inserted into the passage formed between the mutually facing grooved nip rollers 15 directly to the passage 3 formed in the body of said mandrel 1. Further there may be introduced compressed gas immediately into said film body instead of connecting said auxiliary pipe 17 to the bottom end of said compressed gas pipe 9 or to the passage 3a in said mandrel 1. In such case, there is no need for said passages 3a and 3. It is also possible to provide grooved nip rollers 21 illustrated in FIGS. 7 and 8 on the outer peripheral surface of said guide bar 2 just above said heaters 18a to 18d. Said grooved nip rollers 21 have the effect of preventing the shaking of said guide bar 2 and the unnecessary heating of the rotatably embedded rollers 4 and support rollers 5 due to streams of gas ascending from the heaters 10 in the mandrel 1, thereby saving said film body from being broken away or scarred as a result of its undue heating which might otherwise occur, and further forcedly feeding said film body 20 so as to promote the smooth operation of the apparatus.

During the stretching step involved in the method of the present invention, there is formed a thin layer of gas between said mandrel 1 and the upper part 20a of cylindrical film body 20 due to introduction of compressed gas thereinto. The formation of said gas layer is carried out by allowing said compressed gas present on the lower part 20b side of said cylindrical film body 20 to flow through the passages 3a and 3 and be ejected to the top of the round conical section 1a at the lower part of said mandrel 1, namely, into the area where said film body 20a might otherwise directly contact said mandrel 1. Also where there is omitted the passages 3a and 3 said compressed gas is gushed into the aforesaid area. In either case, therefore, said film body 20a is not brought into direct contact with said mandrel 1 due to the formation of said gas layer, nor fused thereto, so that said film body 20a never fails to be easily stretched without being scarred. Particularly where there is supplied compressed gas through said passages 3a 3, there can be effected smooth stretching.

There will now be described the actual fabrication of a biaxially stretched cylindrical film body using the apparatus shown in FIGS. 7 and 8. There was biaxially stretched a nonstretched cylindrical film body 85 mm. in collapsed width and 300 microns in average thickness (with a deviation of ±3%) which was initially molded by water cooled inflation from polypropylene commercially known as "Sumitomo Noblen FL' 132." Thus was manufactured a biaxially stretched film body more adapted for package due to shrinkage with the peripheral speed of grooved nip rollers 21 handling the nonstretched portion 20a of said film body 20 set a 2 m./min. and that of the nip rollers 14 handling the stretched portion 20b thereof at 8 m./min., with the indoor heating temperatures fixed at 110° C. The resultant biaxially oriented polypropylene cylindrical film body was 340 mm. in collapsed width (stretch ratio : machine direction ×transverse direction =4×4=16 times), 19 microns in average thickness (with a deviation of ±10%), about 1,100 Kg./cm.² in longitudinal tensile strength and about 1,150 Kg./cm.² in transverse tensile strength, 45% (lengthwise) and 48% (crosswise) in shrinkage (after being allowed to stand 4 seconds in an atmosphere at a temperature of 140° C.). It was a product with a good surface appearance well balanced both lengthwise and crosswise in strength and shrinkage.

What we claim is:

1. A method for manufacturing a biaxially oriented cylindrical film body which comprises conducting a cylindrical film body from upper nip rollers positioned at the top of guide bar, down said guide bar, through the interstice between internal rotatably embedded rollers and external support rollers, to a mandrel and further to lower nip rollers located below said mandrel; rotatably pressing shock-preventing rollers to said guide bar so as to prevent the shaking of said mandrel; said rotatably embedded rollers being positioned in the peripheral surface of said guide bar; and said support rollers being disposed adjacent said rotatably embedded rollers with said film body allowed to pass therebetween; said guide bar and mandrel being suspended by said support rollers, and biaxially stretching said cylindrical film body by introducing compressed gas thereinto, said stretching being conducted while forming a thin layer of gas between the outer surface of said mandrel of said cylindrical film body.

2. A method according to claim 1 which comprises stretching said cylindrical film body by introducing compressed gas present in the stretched portion of said cylindrical film body into the nonstretched portion thereof through mutually communicating passages running through said mandrel and guide bar.

3. An apparatus for manufacturing a biaxially oriented cylindrical film body which comprises a mandrel to be inserted into a cylindrical film body, a guide bar projecting above said mandrel, shock-preventing rollers pressed to said guide bar so as to prevent the shaking of said mandrel, a pair of rollers rotatably embedded in the peripheral surface of said guide bar, support rollers adjacent to said rotatably embedded rollers upon which are suspended said mandrel and guide bar, upper nip rollers positioned at the top of said guide bar, lower nip rollers disposed below said mandrel and means for introducing compressed gas through said mandrel.

4. An apparatus according to claim 3 where the last mentioned means comprises mutually communicating passages running through said mandrel and guide bar.